United States Patent
Lee et al.

(10) Patent No.: US 12,457,015 B2
(45) Date of Patent: Oct. 28, 2025

(54) WIRELESS CHARGING METHOD AND ELECTRONIC DEVICE SUPPORTING SAME

(71) Applicant: Samsung Electronics Co., Ltd., Suwon-si (KR)

(72) Inventors: Jaesung Lee, Suwon-si (KR); Juhyang Lee, Suwon-si (KR); Jaemu Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/321,359

(22) Filed: May 22, 2023

(65) Prior Publication Data
US 2023/0299813 A1 Sep. 21, 2023

Related U.S. Application Data

(63) Continuation of application No. PCT/KR2022/000016, filed on Jan. 3, 2022.

(30) Foreign Application Priority Data
Jan. 4, 2021 (KR) .................. 10-2021-0000546

(51) Int. Cl.
*H04B 5/79* (2024.01)
*H02J 50/10* (2016.01)
*H04B 5/26* (2024.01)

(52) U.S. Cl.
CPC .............. *H04B 5/79* (2024.01); *H02J 50/10* (2016.02); *H04B 5/266* (2024.01)

(58) Field of Classification Search
CPC ............ H04B 5/79; H04B 5/266; H02J 50/10
See application file for complete search history.

(56) References Cited

U.S. PATENT DOCUMENTS

| | | |
|---|---|---|
| 10,541,560 B2 | 1/2020 | Jung et al. |
| 10,666,082 B2 | 5/2020 | Park et al. |

(Continued)

FOREIGN PATENT DOCUMENTS

| | | |
|---|---|---|
| CN | 110518707 A | 11/2019 |
| CN | 112020044 A | 12/2020 |

(Continued)

OTHER PUBLICATIONS

International Search Report dated Apr. 28, 2022, issued in International Patent Application No. PCT/KR2022/000016.

(Continued)

*Primary Examiner* — David Bilodeau
(74) *Attorney, Agent, or Firm* — Jefferson IP Law, LLP

(57) ABSTRACT

An electronic device is provided. The electronic device includes a first communication circuit, a second communication circuit, a power transmission coil, and a control circuit. The control circuit is configured to connect an external electronic device and the first communication circuit, transmit power to the external electronic device, receive, from the external electronic device, a first signal including a control error packet (CEP) at a first time point, after the first point in time, count a first number of times a specified unit time elapses without the first signal being received, if the first number of times corresponds to a specified first threshold value, transmit, to the external electronic device, a second signal for requesting a second communication connection, and connect the external electronic device and the second communication based on reception of a third signal including a response of the external electronic device to the second signal.

20 Claims, 10 Drawing Sheets

(56) References Cited

U.S. PATENT DOCUMENTS

| | | | |
|---|---|---|---|
| 10,727,696 B2 | 7/2020 | Jung et al. | |
| 11,159,064 B2 | 10/2021 | Lee et al. | |
| 11,316,386 B2 | 4/2022 | Wu et al. | |
| 2015/0349851 A1* | 12/2015 | Yasuoka | H04B 5/26 307/104 |
| 2016/0197486 A1 | 7/2016 | Von Novak, III et al. | |
| 2017/0070104 A1 | 3/2017 | Chung et al. | |
| 2019/0068004 A1* | 2/2019 | Louis | H02J 50/12 |
| 2020/0266674 A1 | 8/2020 | Lee et al. | |
| 2020/0366137 A1* | 11/2020 | Park | H02J 50/60 |
| 2020/0381958 A1 | 12/2020 | Wu et al. | |
| 2020/0403455 A1 | 12/2020 | Abukhalaf et al. | |
| 2022/0085667 A1* | 3/2022 | Park | H02J 7/00034 |
| 2022/0224137 A1* | 7/2022 | Huang | H02J 7/00308 |
| 2022/0231544 A1* | 7/2022 | Yu | H04B 5/79 |

FOREIGN PATENT DOCUMENTS

| | | | |
|---|---|---|---|
| KR | 10-2017-0094879 | A | 8/2017 |
| KR | 10-2018-0062775 | A | 6/2018 |
| KR | 10-2018-0123891 | A | 11/2018 |
| KR | 10-2018-0130812 | A | 12/2018 |
| KR | 10-2019-0011077 | A | 2/2019 |
| KR | 10-2019-0087033 | A | 7/2019 |
| KR | 10-2020-0022086 | A | 3/2020 |
| KR | 10-2020-0098220 | A | 8/2020 |
| KR | 10-2020-0139079 | A | 12/2020 |
| WO | 2019/036061 | A1 | 2/2019 |

OTHER PUBLICATIONS

Korean Notice of Allowance dated Jan. 10, 2025, issued in Korean Patent Application No. 10-2021-0000546.

* cited by examiner

WIRELESS CHARGING METHOD AND ELECTRONIC DEVICE SUPPORTING SAME

CROSS-REFERENCE TO RELATED APPLICATION(S)

This application is a continuation application, claiming priority under § 365(c), of an International application No. PCT/KR2022/000016, filed on Jan. 3, 2022, which is based on and claims the benefit of a Korean patent application number 10-2021-0000546, filed on Jan. 4, 2021, in the Korean Intellectual Property Office, the disclosure of which is incorporated by reference herein in its entirety.

BACKGROUND

1. Field

The disclosure relates to a wireless charging method and an electronic device supporting the same.

2. Description of Related Art

An electronic device includes a wireless charging function based on a magnetic induction scheme, a magnetic resonance scheme, or an electromagnetic wave scheme of charging a battery of an external electronic device by wirelessly transferring power to the external electronic device or charging a mounted battery by wirelessly receiving power from an external electronic device.

During wireless charging, an electronic device and an external electronic device may perform in-band communication using a frequency of a band identical to or adjacent to that of a frequency used for wireless charging in a power coil included in each device. For example, the electronic device and the external electronic device may share data related to wireless charging via the in-band communication.

The above information is presented as background information only to assist with an understanding of the disclosure. No determination has been made, and no assertion is made, as to whether any of the above might be applicable as prior art with regard to the disclosure.

SUMMARY

When an alignment state between an electronic device and an external electronic device (or an alignment state between a power coil of the electronic device and a power coil of the external electronic device) is unstable or a load state of the external electronic device changes rapidly, data transmission or reception based on the in-band communication between the electronic device and the external electronic device may not be stably performed. In this case, wireless charging (or a wireless power transfer function) of the electronic device is stopped, and reliability of the wireless charging may deteriorate.

Accordingly, during wireless charging, switching from the in-band communication to out-band communication using a frequency of a band different from that of a frequency used for wireless charging is being considered. However, continuous operation of out-band communication may cause higher heat generation in the electronic device or the external electronic device than in-band communication. In addition, heat control performed on the electronic device or the external electronic device to suppress such heat generation may decrease a wireless charging speed between the electronic device and the external electronic device.

Aspects of the disclosure are to address at least the above-mentioned problems and/or disadvantages and to provide at least the advantages described below. Accordingly, an aspect of the disclosure is to provide a wireless charging method and an electronic device supporting the same, in which, during wireless charging between an electronic device and an external electronic device, a communication scheme may be dynamically switched to stably share data related to the wireless charging.

Additional aspects will be set forth in part in the description which follows and, in part, will be apparent from the description, or may be learned by practice of the presented embodiments.

In accordance with an aspect of the disclosure, an electronic device is provided. The electronic device includes a first communication circuit supporting first communication in a first frequency band, a second communication circuit supporting second communication in a second frequency band different from the first frequency band, a power transfer coil, and a control circuit electrically connected to the first communication circuit, the second communication circuit, and the power transfer coil.

According to an embodiment, the control circuit may establish, based on the first communication circuit, a first communication connection to an external electronic device, transfer power to the external electronic device based on the first communication using the power transfer coil, receive, based on the first communication, a first signal including a control error packet (CEP) from the external electronic device at a first time point, count, after the first time point, a first number of times for elapse of a designated unit time without reception of the first signal, and if the first number of times for elapse of the designated unit time without reception of the first signal corresponds to a designated first threshold value, transmit, to the external electronic device based on the first communication, a second signal for requesting a second communication connection to the external electronic device, establish the second communication connection to the external electronic device, based on reception of a third signal including a response of the external electronic device to the second signal, and transmit or receive, based on the second communication to or from the external electronic device, at least one piece of data related to the power transfer.

In accordance with another aspect of the disclosure, a wireless charging method of an electronic device is provided. The wireless charging method includes establishing a first communication connection to an external electronic device in a first frequency band, transferring power to the external electronic device based on the first communication using a power transfer coil, receiving, based on the first communication, a first signal including a control error packet (CEP) from the external electronic device at a first time point, and counting, after the first time point, a first number of times for elapse of a designated unit time without reception of the first signal.

According to an embodiment, the counting of the first number of times includes determining that the first number of times for elapse of the designated unit time without reception of the first signal corresponds to a designated first threshold value, transmitting, to the external electronic device based on the first communication, a second signal for requesting a second communication connection to the external electronic device in a second frequency band different from the first frequency band, establishing the second communication connection to the external electronic device, based on reception of a third signal including a response of the external electronic device to the second signal, and transmitting or receiving at least one piece of data related to transmission of the power to or from the external electronic device, based on the second communication.

According to various embodiments, a protocol enabling dynamic switching of a communication scheme between an electronic device and an external electronic device performing wireless charging can be provided.

According to various embodiments, data loss due to a communication failure can be prevented based on dynamic switching of a communication scheme.

According to various embodiments, based on dynamic switching of the communication scheme, heat generation of an electronic device or an external electronic device due to continuous operations of a temperature-sensitive communication scheme can be suppressed, and an operation of the electronic device or the external electronic device related to control of the heat generation can be excluded, so that the wireless charging speed can be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar element, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
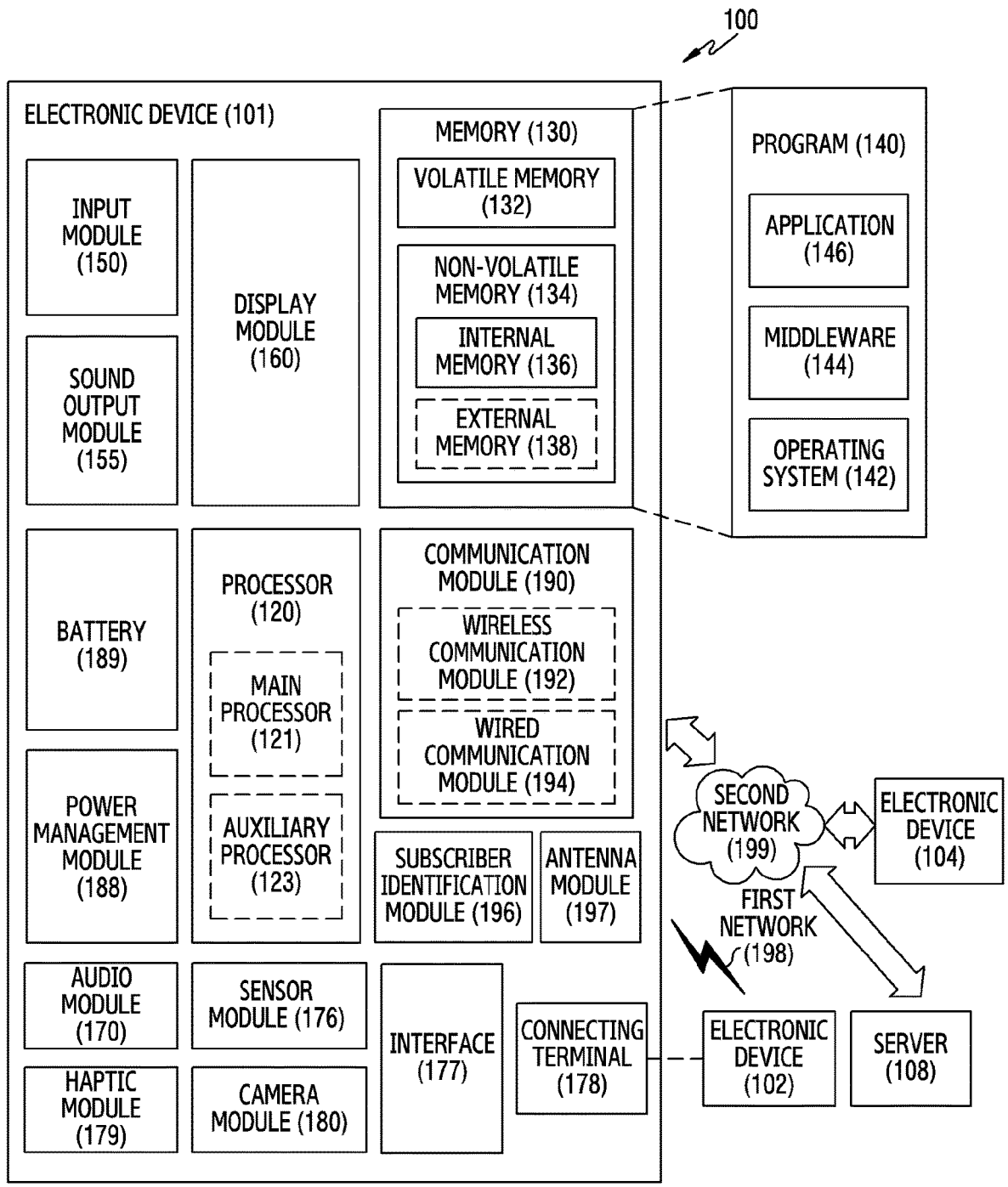
FIG. 1 is a diagram illustrating an electronic device within a network environment according to an embodiment of the disclosure.

FIG. 1 is a diagram illustrating an electronic device within a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
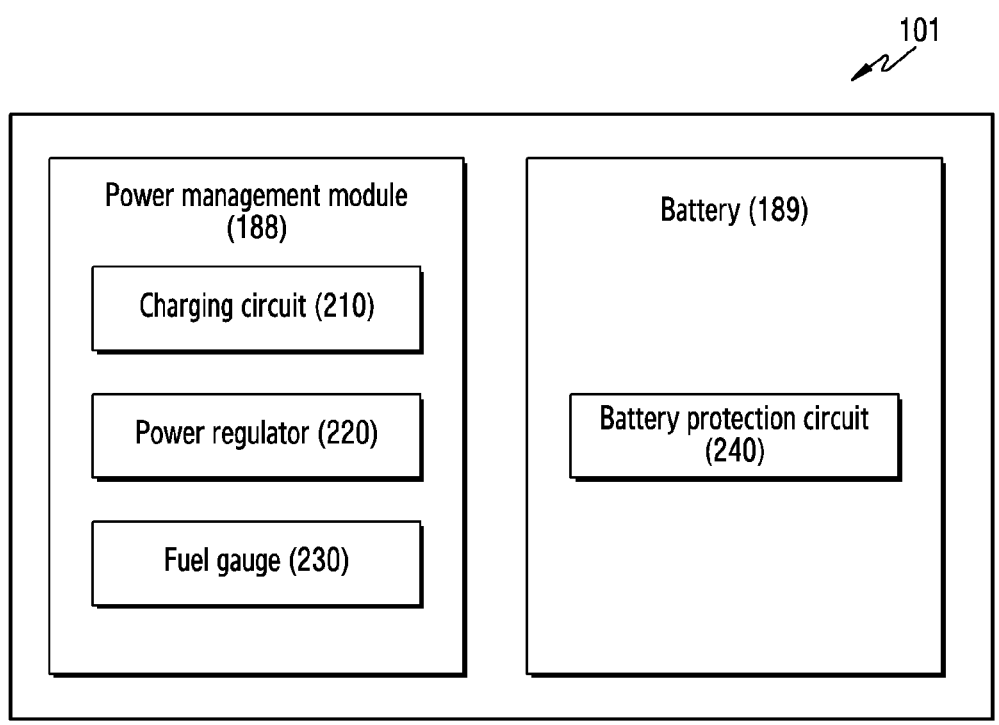
FIG. 2 is a diagram illustrating a power management module and a battery of an electronic device according to an embodiment of the disclosure.

FIG. 2 is a diagram illustrating a power management module and a battery of an electronic device according to an embodiment of the disclosure.

Referring to FIG. 2, the power management module 188 may include charging circuitry 210, a power adjuster 220, or a power gauge 230.

The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator.

The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Hereinafter, a first electronic device or a second electronic device referred to with reference to the drawings may correspond to the aforementioned electronic device of FIG. 1 or 2 (e.g., the electronic device 101 of FIG. 1 or 2). In an embodiment, a first electronic device may include at least one of a Tx function (or a power transfer function) of transferring wireless power to an adjacent second electronic device (e.g., a power reception device) so as to charge the second electronic device, and an Rx function (or a power reception function) of receiving wireless power from the second electronic device (e.g., a power transfer device) so as to charge a mounted battery. Similarly, the second electronic device may include at least one of a Tx function of transferring wireless power to an adjacent first electronic device (e.g., a power reception device) and an Rx function of receiving wireless power from the first electronic device (e.g., a power transfer device). Based on this, functions or operations of the first electronic device to be described below may be equally performed by the second electronic device, and functions or operations of the second electronic device may also be equally performed by the first electronic device.

Figure 3:
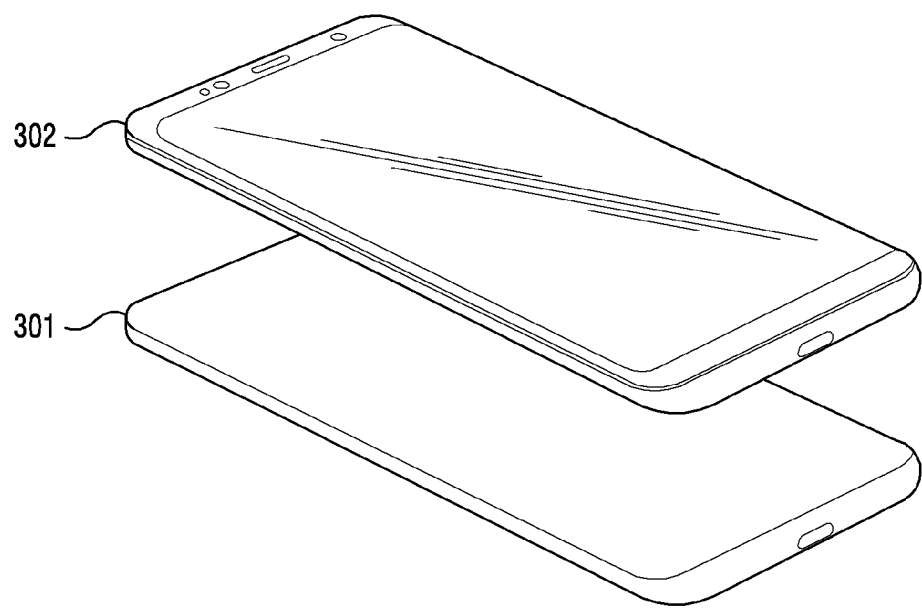
FIG. 3 is a diagram illustrating a wireless charging environment between a first electronic device and a second electronic device according to an embodiment of the disclosure.

FIG. 3 is a diagram illustrating a wireless charging environment between a first electronic device and a second electronic device according to an embodiment of the disclosure.

Referring to FIG. 3, a first electronic device 301 (e.g., a power transfer device) according to an embodiment may transfer wireless power to charge a second electronic device 302 (e.g., a power reception device). For example, if a battery of the second electronic device 302 is not fully charged or the amount of available power of the battery is less than a designated level, the first electronic device 301 may transfer wireless power to charge the battery of the second electronic device 302.

According to an embodiment, at a time prior to transferring the wireless power, for example, in a state of waiting for wireless charging, the first electronic device 301 may determine the proximity of the second electronic device 302 to the first electronic device 301 (or determine the presence of the second electronic device 302 adjacent to the first electronic device 301). In this regard, the first electronic device 301 may transmit a signal (e.g., a ping signal) for determination of the proximity (or presence) of the second electronic device 302 or determination of whether a signal or data transmitted from the first electronic device 301 can reach the second electronic device 302. In an embodiment, the first electronic device 301 may receive a signal (e.g., an acknowledgment (ACK) signal) from the adjacent second electronic device 302 in response to the transmitted signal. Based on reception of the response signal, the first electronic device 301 may determine that the second electronic device 302 is in contact or is in proximity within a designated distance.

According to an embodiment, the first electronic device 301 and the second electronic device 302 may be devices of the same type. For example, the first electronic device 301 and the second electronic device 302 may be mobile devices (e.g., smartphones). According to another embodiment, the first electronic device 301 and the second electronic device 302 may be heterogeneous devices which are at least partially different from each other. For example, one of the first electronic device 301 and the second electronic device 302 may be a wireless charging device (e.g., a wireless charging pad), and the other electronic device may be a mobile device (e.g., a smartphone, a wearable device, or a sound output device (wireless earphones)).

Figure 4:
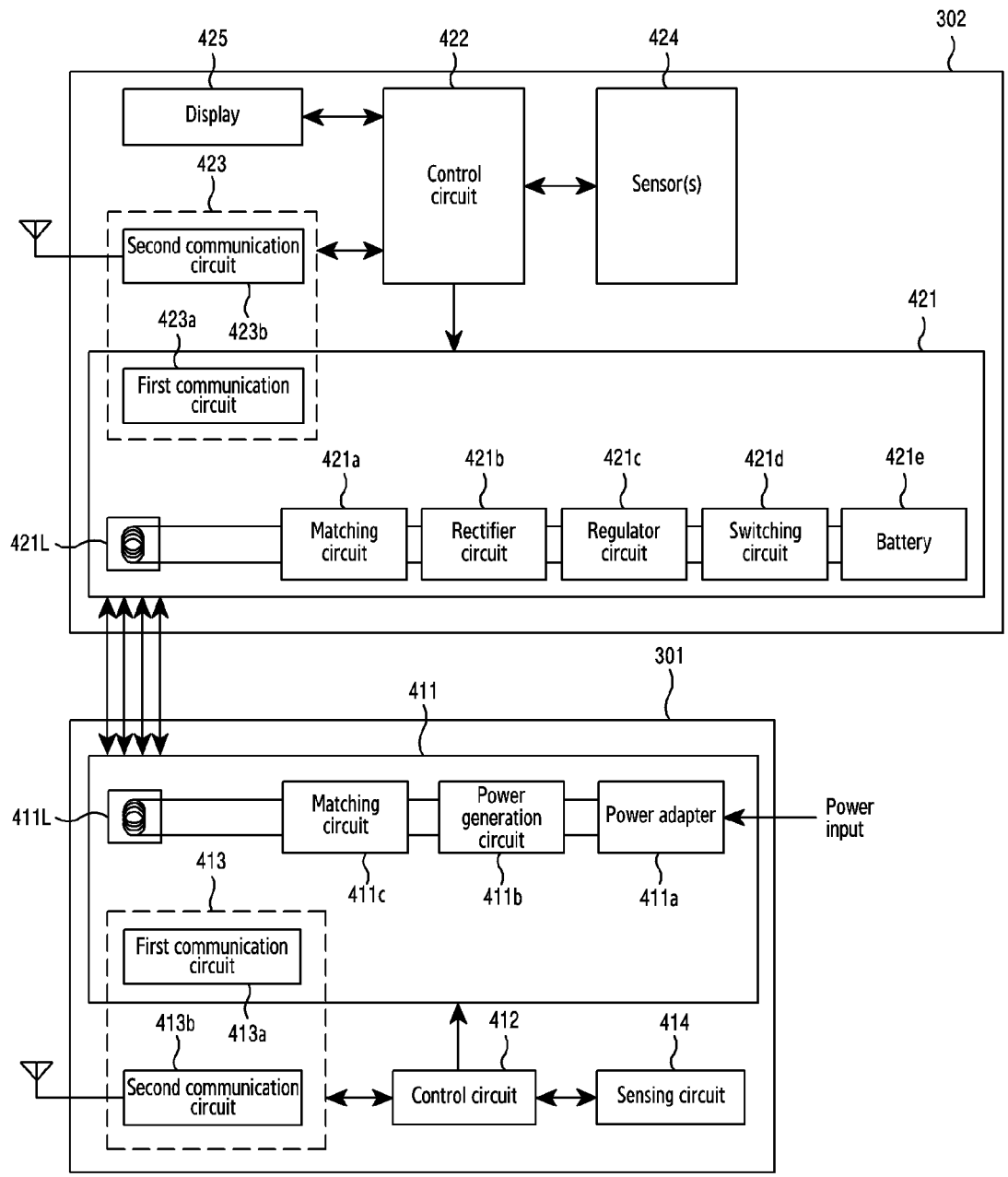
FIG. 4 is a diagram illustrating some elements of each of a first electronic device and a second electronic device according to an embodiment of the disclosure.

FIG. 4 is a diagram illustrating some elements of each of a first electronic device and a second electronic device according to an embodiment of the disclosure.

Referring to FIG. 4, the first electronic device 301 may transfer wireless power to the second electronic device 302 which is in contact with or in proximity to the first electronic device 301 within a designated distance, by using a Tx function (or a power transfer function). In this regard, the first electronic device 301 may include at least one of a power transfer circuit 411, a control circuit 412, a communication circuit 413, and a sensing circuit 414.

The power transfer circuit 411 may receive power from an external power source (e.g., a wall power source, an auxiliary battery device, a laptop computer, a desktop computer, or a smartphone). According to an embodiment, the power transfer circuit 411 may include a power adapter 411a configured to convert voltage of the input power, a power generation circuit 411b configured to generate power, a power transfer coil 411L configured to transfer power, and a matching circuit 411c configured to improve efficiency between the power transfer coil 411L and a power reception coil 421L of the second electronic device 302. According to various embodiments, in order to transfer wireless power to multiple second electronic devices 302, the power transfer circuit 411 may include plural instances for at least one of the power adapter 411a, the power generation circuit 411b, the power transfer coil 411L, and the matching circuit 411c.

The control circuit 412 may perform overall control related to wireless power transfer of the first electronic device 301. In addition, the control circuit 412 may generate and transfer, to the communication circuit 413, various signals or data involved in the wireless power transfer. According to an embodiment, the control circuit 412 may calculate power (or amount of power) to be transferred to the second electronic device 302, based on the signals or data received from the second electronic device 302 based on the communication circuit 413. The control circuit 412 may control the power transfer circuit 411 so that the calculated power is transferred to the second electronic device 302 through the power transfer coil 411L.

According to an embodiment, the control circuit 412 may be integrated with a processor (e.g., the processor 120 of FIG. 1) included in the first electronic device 301, and at least some of functions or operations of the control circuit 412 may be performed by the processor 120. According to another embodiment, the control circuit 412 may be configured independently of the processor 120, and the processor 120 may perform some of the functions or operations for the control circuit 412. According to another embodiment, the control circuit 412 may be configured independently of the processor 120, and the functions or operations of the control circuit 412 may be independently performed by the control circuit 412 regardless of the processor 120.

The communication circuit 413 may include at least one of a first communication circuit 413a and a second communication circuit 413b. According to an embodiment, the first communication circuit 413a may communicate with a first communication circuit 423a of the second electronic device 302 by using a frequency of a band identical to that of a frequency used to transfer wireless power in the power transfer coil 411L or a frequency of a band adjacent to that of the frequency used for transmission of the wireless power. For example, the first communication circuit 413a may support first communication of the in-band scheme for transmitting a signal or data to the first communication circuit 423a of the second electronic device 302 by using the power transfer coil 411L. According to an embodiment, the second communication circuit 413b may communicate with a second communication circuit 423b of the second electronic device 302 by using a frequency of a band different from that of the frequency used for transmission of wireless power. For example, the second communication circuit 413b may support second communication of the out-band scheme for transmitting a signal or data to the second communication circuit 423b of the second electronic device 302 by using an antenna module (e.g., the antenna module 197 of FIG. 1) included in the first electronic device 301. According to various embodiments, the second communication supported by the second communication circuit 413b may include at least one of Bluetooth low energy, Bluetooth, Wi-Fi, cellular communication, and near field communication (NFC).

The sensing circuit 414 may include at least one sensor. The sensing circuit 414 may detect at least one state relating to the first electronic device 301 by using the at least one sensor. According to an embodiment, the sensing circuit 414 may include at least one of a temperature sensor, a motion sensor, a voltage sensor, and a current sensor. The sensing circuit 414 may sense a temperature state of the first electronic device 301 by using the temperature sensor, or may sense a movement (or motion) state of the first electronic device 301 by using the motion sensor. Alternatively, the sensing circuit 414 may sense an output signal state (e.g., a current magnitude, a voltage magnitude, and/or a power magnitude) of the first electronic device 301 by using the voltage sensor or the current sensor. According to an embodiment, the voltage sensor or the current sensor may measure a signal for the power transfer circuit 411 in order to sense a state of an output signal of the first electronic device 301. For example, the voltage sensor or the current sensor may measure a signal for at least one of the matching circuit 411c and the power generation circuit 411b and, in this regard, may include a circuit for measuring a signal for a front end of the power transfer coil 411L.

Although not illustrated, according to various embodiments, the first electronic device 301 may further include a display module (e.g., the display module 160 of FIG. 1). The first electronic device 301 may output, using the display module 160, various information (e.g., notification information on the proximity (or presence) of the second electronic device 302, information on a charging state of the first electronic device 301, or information on a charging state of the second electronic device 302) related to wireless charging.

In an embodiment, the second electronic device 302 may receive wireless power from the first electronic device 301 which is in contact with or in proximity to the second electronic device 302 within a designated distance, by using an Rx function (or a power reception function). In this regard, the second electronic device 302 may include a power reception circuit 421, a control circuit 422, the communication circuit 423, and at least one sensor 424, and a display 425. Among the elements of the second electronic device 302, redundant descriptions of elements corresponding to those of the first electronic device 301 described above may be omitted.

The power reception circuit 421 may include the power reception coil 421L configured to receive wireless power from the power transfer coil 411L of the first electronic device 301, a matching circuit 421a configured to improve efficiency between the power transfer coil 411L and the power reception coil 421L, a rectifier circuit 421b configured to rectify received alternate current (AC) power to dual connectivity (DC), a regulator circuit 421c configured to regulate a charging voltage, a battery 421e, and a switching circuit 421d configured to selectively connect the regulator circuit 421c and the battery 421e.

The control circuit 422 may perform overall control related to wireless power reception of the second electronic device 302, and may generate various signals or data involved in the wireless power reception and transfer the same to the communication circuit 423.

The communication circuit 423 may include at least one of the first communication circuit 423a supporting the first communication of the in-band scheme with respect to the first communication circuit 413a of the first electronic device 301 by using the power reception coil 421L, and the second communication circuit 423b supporting the second communication of the out-band scheme with respect to the second communication circuit 413b of the first electronic device 301 by using an antenna module (e.g., the antenna module 197 of FIG. 1) of the second electronic device 302.

The at least one sensor 424 may include at least one of a temperature sensor, a motion sensor, a voltage sensor, and a current sensor. The at least one sensor 424 may sense at least one state relating to the second electronic device 302 by using the sensor. The display 425 may visually display various information related to wireless charging of the second electronic device 302.

Figure 5:
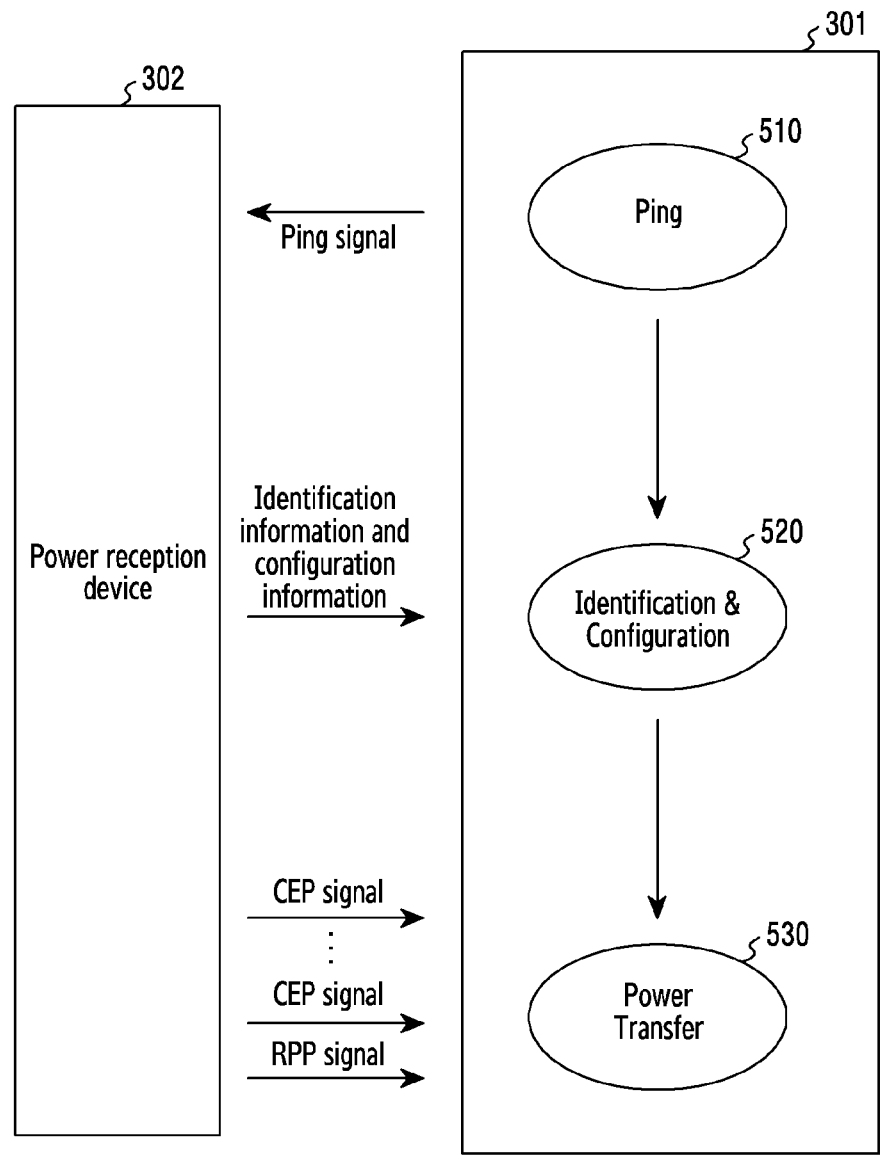
FIG. 5 is a diagram illustrating a wireless charging process between a first electronic device and a second electronic device according to an embodiment of the disclosure.

FIG. 5 is a diagram illustrating a wireless charging process between a first electronic device and a second electronic device according to an embodiment of the disclosure.

Referring to FIG. 5, in operations of the Tx function (or power transfer function), the first electronic device 301 may sequentially perform a ping operation 510, an identification and configuration operation 520, and a power transfer operation 530. Based on the ping operation 510, the identification and configuration operation 520, and the power transfer operation 530, the first electronic device 301 may sense and identify the second electronic device 302 which is in contact with or in proximity to the first electronic device 301 within a designated distance, and may transfer wireless power to the sensed and identified second electronic device 302.

In an embodiment, a control circuit (e.g., the control circuit 412 of FIG. 4) of the first electronic device 301 may perform the ping operation 510 while waiting (or preparing) for wireless charging. For example, the control circuit 412 may transfer, via the ping operation 510, a digital or analog ping signal for sensing a target for the wireless charging. According to an embodiment, the control circuit 412 may receive an ACK signal in response to the ping signal from the second electronic device 302. The control circuit 412 may recognize the presence of the second electronic device 302 (e.g., the second electronic device 302 being in contact with or in proximity to the first electronic device 301 within a designated distance), based on reception of the ACK signal.

According to various embodiments, during the ping operation 510, the control circuit 412 of the first electronic device 301 may determine at least one parameter related to transmission of the ping signal. For example, the control circuit 412 may determine a parameter related to at least one of a frequency of the ping signal, a voltage applied to a power transfer circuit (e.g., the power transfer circuit 411 of FIG. 4) to transmit the ping signal, and a transmission period of the ping signal. In various embodiments, the at least one parameter may be configured to be a default value in initial configuration relating to wireless charging of the first electronic device 301.

In an embodiment, as the presence of the second electronic device 302 is recognized based on reception of the ACK signal, the control circuit 412 of the first electronic device 301 may establish, in the identification and configuration operation 520, a first communication connection of the in-band scheme with respect to the second electronic device 302 by using a first communication circuit (e.g., the first communication circuit 413a of FIG. 4). The control circuit 412 may receive at least one signal or data from the second electronic device 302 by using the first communication. The at least one signal or data may include, for example, information (e.g., a wireless communication identification (ID) of the second electronic device 302) enabling identification of the second electronic device 302. In an embodiment, if the information received from the second electronic device 302 corresponds to information (e.g., a wireless communication ID of at least one external electronic device authorized to share wireless power with the first electronic device 301) pre-recorded in a memory (e.g., the memory 130 of FIG. 1), the control circuit 412 may determine that the second electronic device 302 recognized in the ping operation 510 is a valid device for wireless charging. In various embodiments, the at least one signal or data may further include various configuration information required for the second electronic device 302 to receive wireless power from the first electronic device 301.

In an embodiment, as the second electronic device 302 is identified based on the information received from the second electronic device 302, the control circuit 412 of the first electronic device 301 may transfer wireless power to the second electronic device 302 in the power transfer operation 530. According to an embodiment, while transferring wireless power to the second electronic device 302, the control circuit 412 may receive at least one signal of data from the second electronic device 302 by using the first communication established to the second electronic device 302. For example, control circuit 412 may receive the signal or data including at least one of a control error packet (CEP) indicating notification information about power (or amount of power) required for charging by the second electronic device 302, a received power packet (RPP) indicating magnitude information of power (or amount of power) being received by the second electronic device 302, an end power transfer (EPT) indicating a wireless charging stop request of the second electronic device 302, and a point-to-point protocol (PPP) indicating a data link protocol between the first electronic device 301 and the second electronic device 302. In various embodiments, the signal or data that the first electronic device 301 receives from the second electronic device 302 by using the first communication may further include various packets, messages, or information related to wireless charging in addition to at least one of the CEP, RPP, EPT, and PPP. In an embodiment, based on at least one of the CEP and RPP received from the second electronic device 302 by using the first communication, the control circuit 412 may regulate at least a part of the wireless power transferred to the second electronic device 302.

Figure 6:
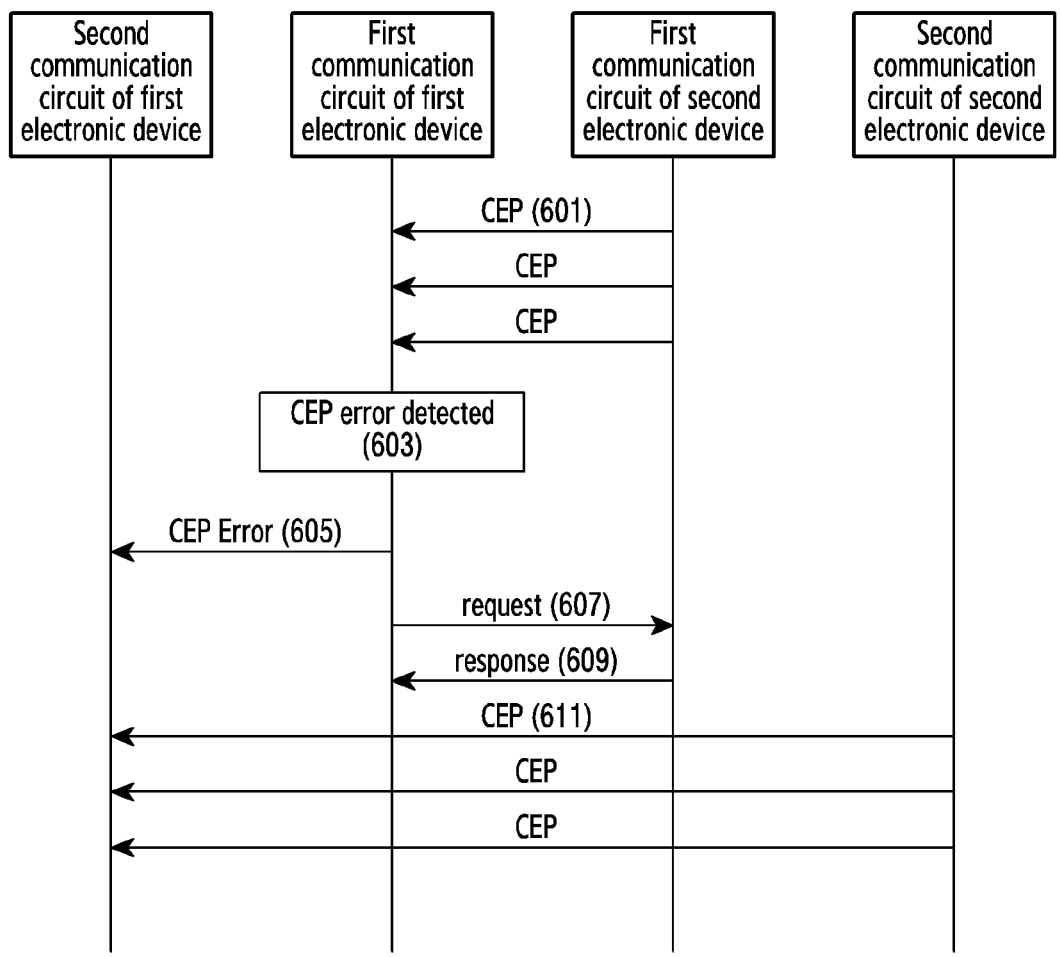
FIG. 6 is a diagram illustrating a signal flow related to wireless charging between a first electronic device and a second electronic device according to an embodiment of the disclosure.

FIG. 6 is a diagram illustrating a signal flow related to wireless charging between a first electronic device and a second electronic device according to an embodiment of the disclosure.

Referring to FIG. 6, in operation 601, a first electronic device (e.g., the power transfer device or the first electronic device 301 of FIG. 3, 4, or 5) may at least receive a signal (e.g., a first signal) including a CEP from the second electronic device (e.g., the power reception device or the second electronic device 302 of FIG. 3, 4, or 5). For example, while transferring wireless power to the second electronic device 302 (e.g., while performing the power transfer operation 530 of FIG. 5), a control circuit (e.g., the control circuit 412 of FIG. 4) of the first electronic device 301 may receive the signal including the CEP from a first communication circuit (e.g., the first communication circuit 423a of FIG. 4) of the second electronic device 302 by using the first communication supported by a first communication circuit (e.g., the first communication circuit 413a of FIG. 4). According to various embodiments, the second electronic device 302 may transmit the signal including the CEP according to a designated period, and the first electronic device 301 may receive the signal transmitted from the second electronic device 302 according to a period substantially identical to or similar to the designated period.

In operation 603, the control circuit 412 of the first electronic device 301 may identify whether the CEP has been normally received from the second electronic device 302 via the first communication. In this regard, the control circuit 412 of the first electronic device 301 may refer to a preconfigured unit time during the identification of whether the CEP has been normally received. The unit time may refer to, for example, a time range defined to receive the signal including the CEP from the second electronic device 302. In various embodiments, the unit time may be configured to be a default value during initial configuration for wireless charging of the first electronic device 301, or may be configured or changed based on a user input.

In an embodiment, after a time (e.g., a first time point) at which the signal including the CEP is first received from the second electronic device 302, the control circuit 412 of the first electronic device 301 may identify whether a CEP has been normally received via the first communication. For example, if a signal including a CEP is received from the second electronic device 302 via the first communication within the unit time based on the time (e.g., the first time point) at which the signal including the CEP is first received, the control circuit 412 may determine that the CEP has been normally received during the corresponding unit time. For another example, if a signal including a CEP is not received from the second electronic device 302 via the first communication within the unit time based on the time (e.g., the first time point) at which the signal including the CEP is first received, the control circuit 412 may count the number of times the unit time elapses without reception of a signal including CEP. For example, during the first unit time based on the time (e.g., the first time point) at which the signal including CEP is first transmitted, if the first unit time elapses without reception of a signal including a CEP, the control circuit 412 may count one time. In addition, during a second unit time subsequent to the first unit time, if the second unit time elapses without reception of a signal including CEP, the control circuit 412 may additionally count one time. For another example, if the first unit time elapses without reception of a signal including CEP during the first unit time, the control circuit 412 may count one time, and if a signal including a CEP is received at a time (e.g., a second time point) within the second unit time subsequent to the first unit time, counting for the second unit time may be omitted. In addition, during a third unit time subsequent to the second unit time, if the third unit time elapses without reception of a signal including CEP, the control circuit 412 may additionally count one time. In an embodiment, if the sum of the number of counts (e.g., a first number of times) corresponds to (or reaches) a designated first threshold value, the control circuit 412 may determine (e.g., a CEP error) that a CEP is not normally received via the first communication, after the time (e.g., the first time point) at which the signal including the CEP is first received from the second electronic device 302.

According to various embodiments, even if a signal including a CEP is received from the second electronic device 302 via the first communication within the unit time based on the time (e.g., the first time point) at which the signal including CEP is first received, the control circuit 412 may determine that the signal is not received, based on a state of the CEP. For example, although the signal including the CEP has been received from the second electronic device 302 via the first communication, if at least a part of the CEP included in the signal is corrupted (or unreadable by the control circuit 412) due to various contexts (e.g., presence of a foreign matter between the first electronic device 301 and the second electronic device 302, unstable alignment between the first electronic device 301 and the second electronic device 302, or communication noise due to a surrounding environment), the control circuit 412 may determine that the signal including CEP is not received from the second electronic device 302 so as to perform counting for the unit time.

According to various embodiments, the designated first threshold value compared with the sum of the number of counts (e.g., the first number of times) may be configured based on a state transition (or state switch) related to wireless charging of the first electronic device 301. In this regard, the first electronic device 301 may count the number of times the unit time elapses without reception of a signal including a CEP via the first communication established with respect to the second electronic device 302, and if the sum of the number of counts (e.g., a second number of times) corresponds to (or reaches) a specified second threshold value, a failure of the first communication or disconnection of the second electronic device 302 from the first electronic device 301 (or separation exceeding a designated distance) may be determined. The control circuit 412 may stop, based on the determination, wireless charging (or the wireless power transfer function that is being executed). In addition, the control circuit 412 may control the first electronic device 301 to transition to a wireless charging standby (or preparation) state (e.g., transition to the ping operation 510 of FIG. 5). Based on this, the designated first threshold value may be configured to be a value smaller than the second threshold value referred to for the first electronic device 301 to stop wireless charging. Accordingly, the control circuit 412 may determine switching of the communication scheme (e.g., switching from the first communication to the second communication), which will be described later, at the time before wireless charging of the first electronic device 301 is stopped.

In operation 605, according to determination that a CEP is not normally received via the first communication, the control circuit 412 of the first electronic device 301 may reflect a result of the determination (e.g., CEP error) to the operation of a second communication circuit (e.g., the second communication circuit 413b of FIG. 4). For example, while transferring wireless power to the second electronic device 302 (e.g., while performing the power transfer operation 530 of FIG. 5), the control circuit 412 may control the second communication circuit 413b, which has been at least temporarily in an inactive state (e.g., a state where no power is supplied, a sleep state, a pause state, or a state where no communication function is operated), into an active state (e.g., a state where power is supplied, an active state, or a state where the communication function is operated). In various embodiments, when the second communication circuit 413b is at least temporarily active while transferring wireless power to the second electronic device 302, the control circuit 412 may skip operation 605.

In operation 607 and operation 609, the control circuit 412 of the first electronic device 301 may transmit, to the second electronic device 302, a signal (e.g., a second signal) for requesting a second communication connection to the second electronic device 302, and may receive a signal (e.g., a third signal) transmitted from the second electronic device 302 in response to the request. For example, the control circuit 412 may transmit, to the first communication circuit 423a of the second electronic device 302, the signal for requesting the second communication connection, by using the first communication supported by the first communication circuit 413a. In addition, the control circuit 412 may receive a signal responding to the request, from the first communication circuit 423a of the second electronic device 302 by using the first communication. According to various embodiments, the request signal transmitted from the first electronic device 301 may further include a request for the second electronic device 302 to control or maintain the second communication circuit (e.g., the second communication circuit 423b of FIG. 4) of the second electronic device 302 in the active state. In an embodiment, the response signal transmitted from the second electronic device 302 may indicate permission for the second communication connection to the first electronic device 301, and the control circuit 412 of the first electronic device 301 may establish the second communication connection to the second electronic device 302, based on the response signal.

In operation 611, based on the second communication established with respect to the second electronic device 302, the control circuit 412 of the first electronic device 301 may transmit or receive, to or from the second electronic device 302, at least one signal or data to be used for wireless charging. For example, the control circuit 412 may receive a signal or data including at least one of CEP, RPP, EPT, and PPP from the second communication circuit 423b of the second electronic device 302 via the second communication supported by the active second communication circuit 413b. In various embodiments, the signal or data that the first electronic device 301 receives from the second electronic device 302 by using the second communication may further include various packets, messages, or information related to wireless charging in addition to at least one of the CEP, RPP, EPT, and PPP.

Figure 7:
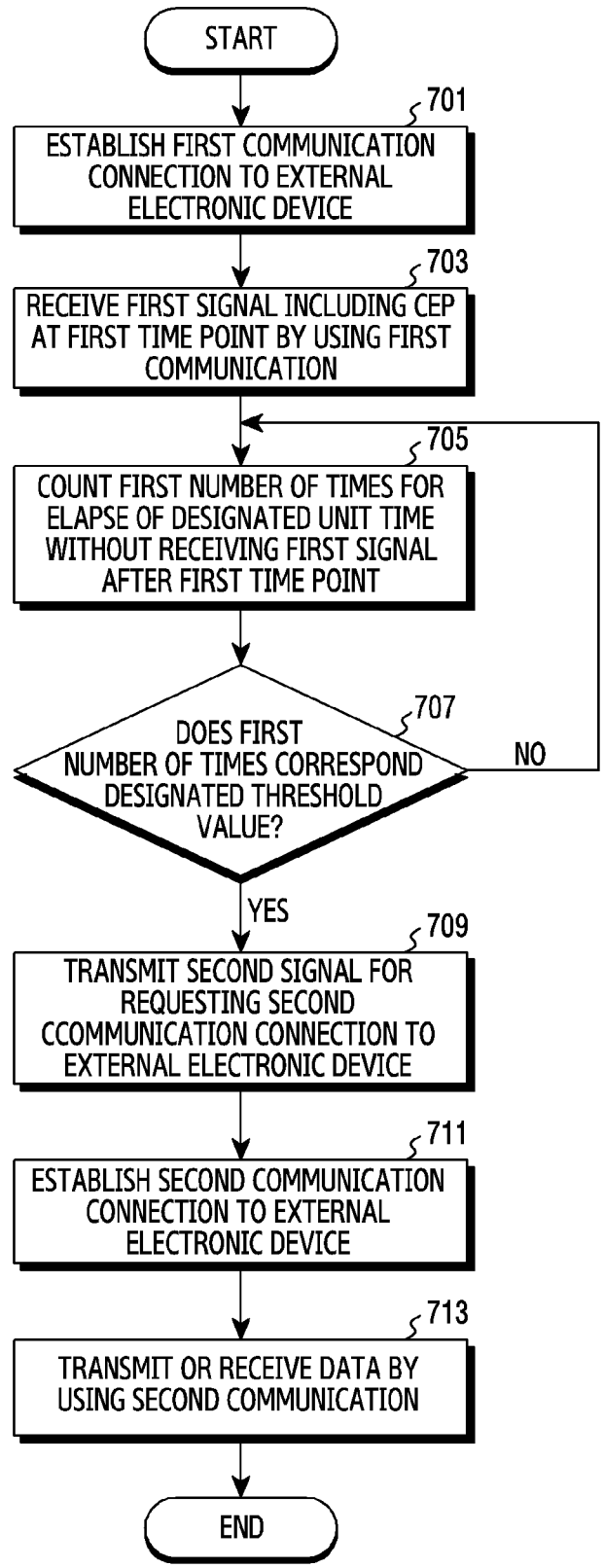
FIG. 7 is a diagram illustrating communication switching of a first electronic device according to an embodiment of the disclosure.
Figure 8:
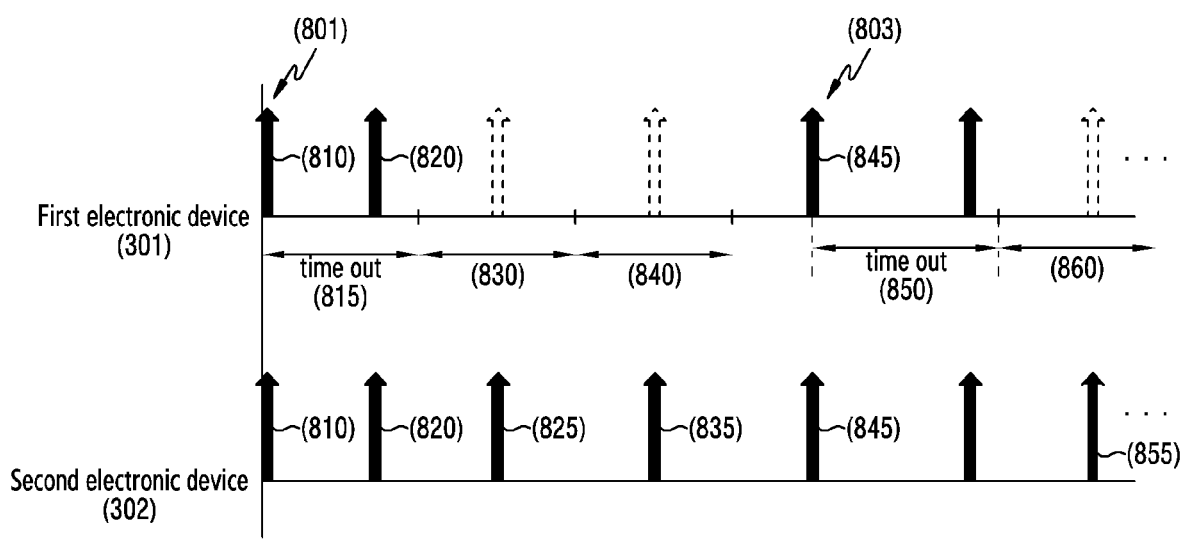
FIG. 8 is a diagram illustrating CEP transmission or reception between a first electronic device and a second electronic device according to an embodiment of the disclosure.

FIG. 7 is a diagram illustrating communication switching of a first electronic device according to an embodiment of the disclosure. FIG. 8 is a diagram illustrating CEP transmission or reception between a first electronic device and a second electronic device according to an embodiment of the disclosure.

At least some of operations of the first electronic device described with reference to FIGS. 7 and 8 may be the same as or similar to the operations of the first electronic device described above referring to FIG. 6, and redundant descriptions, hereinafter, may be omitted.

Referring to FIGS. 7 and 8, in operation 701, the first electronic device 301 (e.g., the power transfer device) may establish a first communication connection to an external electronic device (e.g., the second electronic device 302 or the power reception device). For example, in an identification and configuration operation (e.g., the identification and configuration operation 520 of FIG. 5) for configuring a wireless charging process with the second electronic device 302 recognized based on a ping operation (e.g., the ping operation 510 of FIG. 5), a control circuit (e.g., the control circuit 412 of FIG. 4) of the first electronic device 301 may control a first communication circuit (e.g., the first communication circuit 413a of FIG. 4) so as to establish the first communication connection to a first communication circuit (e.g., the first communication circuit 423a of FIG. 4) of the second electronic device 302. According to an embodiment, the first communication may include in-band communication using a frequency of a band identical to or adjacent to that of a frequency used to transfer wireless power in a power transfer coil (e.g., the power transfer coil 411L of FIG. 4).

In operation 703, the control circuit 412 of the first electronic device 301 may receive a signal (e.g., a first signal) including a CEP from the second electronic device 302 by using the first communication connected to the second electronic device 302. For example, the control circuit 412 may receive a signal 810 including a CEP from the first communication circuit 423a of the second electronic device 302 by using the first communication at a first time point 801 after a connection is made to the second electronic device 302 via the first communication. In an embodiment, in response to reception of the signal 810 at the first time point 801, the control circuit 412 may identify whether a signal including a CEP is received from the second electronic device 302 within a designated unit time (e.g., time out) based on the first time point 801. For example, if a signal 820 including a CEP is received from the first communication circuit 423a of the second electronic device 302 within a first unit time 815 based on the first time point 801, the control circuit 412 may determine that the CEP has been normally received via the first communication circuit 413a during the first unit time 815.

In operation 705, the control circuit 412 of the first electronic device 301 may count the number of times (e.g., the first number of times) that the unit time elapses without reception of a signal including a CEP from the second electronic device 302. For example, according to determination that the CEP has been normally received via the first communication during the first unit time 815, the control circuit 412 may identify whether a signal including a CEP is received for a second unit time 830 after the first unit time 815. The control circuit 412 may count one time if the second unit time 830 elapses without reception of a signal 825 including a CEP from the second electronic device 302 during the second unit time 830.

In operation 707, the control circuit 412 of the first electronic device 301 may determine whether the number of counts (e.g., one time) corresponds to a designated first threshold value. The designated first threshold value may be configured, for example, to be a value smaller than a designated second threshold value referred to in order for the first electronic device 301 to stop wireless charging (or wireless power transfer function). In an embodiment, if the counted number of times is determined not to correspond to the first threshold value, the control circuit 412 may return to operation 705 and identify whether a signal including a CEP has been received via the first communication for a subsequent unit time. For example, the control circuit 412 may identify whether a signal including a CEP has been received for a third unit time 840 after the second unit time 830, and may count one time if the third unit time 840 elapses without reception of a signal 835 including a CEP from the second electronic device 302 during the third unit time 840. In this operation, the control circuit 412 may add up one count for the second unit time 830 and one count for the third unit time 840.

Similar to the above, if it is determined that the number of times counted until the third unit time 840 elapses (e.g., two times) does not correspond to the designated first threshold value, the control circuit 412 of the first electronic device 301 may identify whether a signal including a CEP is received for a fourth unit time subsequent to the third unit time 840. In this operation, if a signal 845 including a CEP is received from the second electronic device 302 during the fourth unit time, counting for the fourth unit time may be omitted, and the control circuit 412 may determine a reference (e.g., a starting point) of a subsequent fifth unit time 850 to be the second time point 803 at which the signal 845 including the CEP is received within the fourth unit time. Based on this, until the number of times (e.g., the counted and summed up number of times) the unit time elapses without reception of a signal including a CEP corresponds to (or reaches) the designated first threshold value, the reference (e.g., the starting point) of the unit time may be changed depending on whether a signal including a CEP is received from the second electronic device 302.

In an embodiment, the control circuit 412 of the first electronic device 301 may identify whether a signal including a CEP is received via the first communication for an Nth unit time 860. The control circuit 412 may count M times (e.g., the sum of previously summed up M−1 times and one time) if the N unit time elapses without reception of a signal 855 including a CEP from the second electronic device 302 during the N unit time 860. If the sum of the number of counts (e.g., M times) corresponds to (or reaches) the designated first threshold value, the control circuit 412 may determine (e.g., a CEP error) that a CEP is not normally received via the first communication, after the first time point 801 at which the signal including the CEP is first received from the second electronic device 302.

In an embodiment, according to determination that a CEP is not normally received via the first communication, the control circuit 412 of the first electronic device 301 may transmit, to the second electronic device 302 in operation 709, a signal (e.g., a second signal) for requesting a second communication connection to the second electronic device 302. For example, the control circuit 412 may transmit the signal for requesting connection to the second communication, by using the first communication for which the connection to the second electronic device 302 has been established. In this operation, the control circuit 412 may control a second communication circuit (e.g., the second communication circuit 413b of FIG. 4) of the first electronic device 301 in an active state.

According to various embodiments, the control circuit 412 may further include, in the signal (e.g., the second signal) for requesting connection to the second communication, a request for the second electronic device 302 to control or maintain a second communication circuit (e.g., the second communication circuit 423b of FIG. 4) of the second electronic device 302 in an active state. In various embodiments, the second communication may include outband communication (e.g., at least one of Bluetooth low energy communication, Bluetooth communication, Wi-Fi communication, cellular communication, and near field wireless communication) using a frequency of a band different from that of a frequency used in the power transfer coil 411L for wireless power transfer by the first electronic device 301.

In operation 711, the control circuit 412 of the first electronic device 301 may receive, using the first communication, a response signal (e.g., a third signal) indicating permission for the request from the second electronic device 302. In addition, the control circuit 412 may establish the second communication connection to the second communication circuit 423b of the second electronic device 302, based on the second communication circuit 413b that is active based on the response. In various embodiments, after establishing the second communication connection to the second electronic device 302, the control circuit 412 of the first electronic device 301 may maintain the active state of the first communication previously connected to the second electronic device 302 and the first communication circuit 413a supporting the first communication.

In operation 713, the control circuit 412 of the first electronic device 301 may transmit or receive, to or from the second electronic device 302, at least one signal or data by using the second communication connected to the second electronic device 302. For example, the control circuit 412 may receive a signal including at least one of CEP, RPP, EPT, and PPP from the second communication circuit 423b of the second electronic device 302, based on the second communication.

According to various embodiments, the control circuit 412 of the first electronic device 301 may use the second communication to cause the second electronic device 302 to maintain the connection of the first communication established with respect to the first electronic device 301, and may transmit, while transmitting a signal including a CEP via the second communication, a signal (e.g., a fourth signal) for requesting transmission of a signal including a CEP via the first communication. Based on this, the second electronic device 302 which receives the request signal from the first electronic device 301 may transmit a signal including at least one of the CEP, RPP, EPT, and PPP via each of the first communication and the second communication, in which the connection to the first electronic device 301 has been established.

In an embodiment, while receiving a signal including a CEP from the second communication circuit 423b of the second electronic device 302 by using the second communication, the control circuit 412 of the first electronic device 301 may identify whether a signal including a CEP is normally received via the first communication. For example, based on a time (e.g., a third time point) at which a signal (e.g., a first signal) including a CEP is first received via the second communication, the control circuit 412 may identify whether a signal including a CEP is normally received via the first communication from the second electronic device 302 within a designated unit time. For example, based on the time (e.g., the third time point) at which the signal including the CEP is first received via the second communication, if a signal including a CEP is received via the first communication during the first unit time, the control circuit 412 may count one time for elapse of the first unit time. In addition, if a signal including a CEP is received via the first communication during a second unit time subsequent to the first unit time, the control circuit 412 may additionally count one time for elapse of the second unit time. In an embodiment, if unit times for reception of signals including a CEP via the first communication have a continuous sequence, and the sum of the counted number of times (e.g., the third number of times) corresponds to (or reaches) a designated third threshold value, the control circuit 412 may determine that the CEP is normally received via the first communication after establishment of the second communication connection to the second electronic device 302.

In an embodiment, according to determination that a CEP has been normally received via the first communication after establishment of the second communication connection, the control circuit 412 of the first electronic device 301 may transmit a signal (e.g., a fifth signal) to the second electronic device 302 by using the first communication or the second communication. For example, the control circuit 412 may transmit a signal for requesting the second electronic device 302 to at least temporarily control the second communication circuit 423b of the second electronic device 302 to be inactive. In various embodiments, the request to control the second communication circuit 423b to be inactive may be an operation for suppressing heat generation of the first electronic device 301 and the second electronic device 302 due to continuous operation of the second communication between the first electronic device 301 and the second electronic device 302.

In an embodiment, in response to reception of the signal (e.g., the fifth signal) from the first electronic device 301, the second electronic device 302 may control the second communication circuit 423b to be at least temporarily inactive. In addition, the second electronic device 302 may transmit a signal including at least one of CEP, RPP, EPT, and PPP by using the first communication connected to the first electronic device 301. The control circuit 412 of the first electronic device 301 may identify whether the CEP has been normally received from the second electronic device 302 via the first communication.

Figure 9:
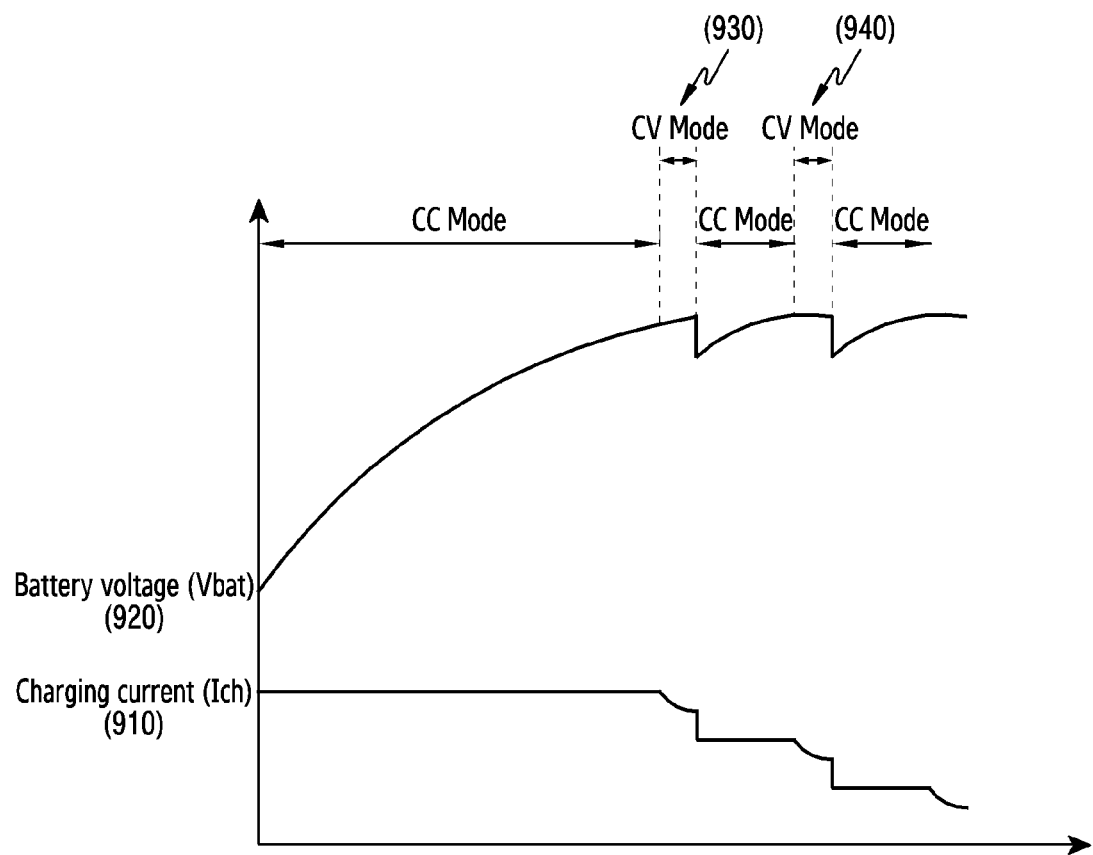
FIG. 9 is a diagram illustrating a charging mode of a second electronic device according to an embodiment of the disclosure.

FIG. 9 is a diagram illustrating a charging mode of a second electronic device according to an embodiment of the disclosure.

Referring to FIG. 9, a second electronic device (e.g., the power reception device or the second electronic device 302 of FIG. 3, 4, or 5) may operate between a constant current (CC) mode and a constant voltage (CV) mode while receiving wireless power from a first electronic device (e.g., the power transfer device or the first electronic device 301 of FIG. 3, 4, or 5). For example, the second electronic device 302 may operate in the CC mode in which charging is performed with a charging current 910 of a fixed value until a battery voltage 920 of the second electronic device 302 reaches a preconfigured full charge voltage. For another example, the second electronic device 302 may operate in the CV mode in which charging is performed with the charging current 910 of a decreasing value so that the full charge voltage is maintained after the battery voltage 920 of the second electronic device 302 reaches the full charge voltage.

According to an embodiment, the first electronic device 301 may transmit, to the second electronic device 302, a signal (e.g., a sixth signal) for requesting information on a charging mode of the second electronic device 302, during wireless power transfer (e.g., the power transfer operation 530 of FIG. 5) to the second electronic device 302. For example, a control circuit (e.g., the control circuit 412 of FIG. 4) of the first electronic device 301 may transmit the signal for requesting information on the charging mode according to a designated period by using the first communication in which a connection to the second electronic device 302 has been established. In an embodiment, the control circuit 412 may acquire information on the charging mode of the second electronic device 302, based on a response of the second electronic device 302 to the request, and may identify that the second electronic device 302 operates in the CV mode 930 or 940.

According to an embodiment, the control circuit 412 of the first electronic device 301 may identify whether a CEP is normally received via the first communication, which is described above, at a point in time when the CV mode 930 or 940 operation of the second electronic device 302 is identified. In this regard, when the second electronic device 302 operates in the CV mode 930 or 940, as the second electronic device 302 is charged with the charging current 910 of a decreasing value, an intensity or gain of a signal (e.g., a signal including a CEP) of the first communication based on a power reception coil (e.g., the power reception coil 421L of FIG. 4) of the second electronic device 302 may decrease. Based on this, when the CV mode 930 or 940 of the second electronic device 302 is identified, the control circuit 412 of the first electronic device 301 may identify whether a signal including a CEP is normally received via the first communication. For example, the control circuit 412 may count the number of times a designated unit time elapses without reception of a signal (e.g., a first signal) including a CEP, and may determine whether to switch from the first communication to the second communication, based on the sum of the counted number of times. However, various operations of the first electronic device 301 described above are not limited to being performed only in the CV mode 930 or 940 of the second electronic device 302. For example, regardless of the CC mode operation or the CV mode operation of the second electronic device 302, the control circuit 412 of the first electronic device 301 may identify whether a signal including a CEP is normally received via the first communication, and may determine, based on the identification, whether to switch from the first communication to the second communication.

Figure 10:
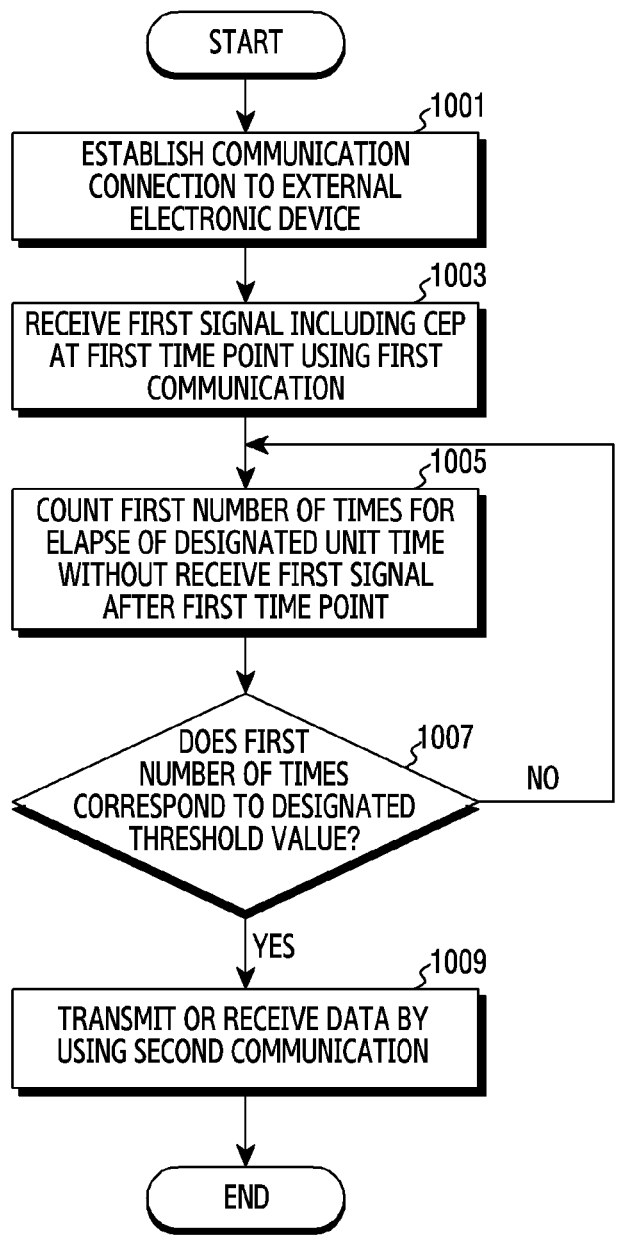
FIG. 10 is a diagram illustrating communication switching of a first electronic device according to an embodiment of the disclosure.

FIG. 10 is a diagram illustrating communication switching of a first electronic device according to an embodiment of the disclosure.

At least some of operations of the first electronic device described with reference to FIG. 10 may be the same as or similar to the operations of the first electronic device described above with reference to FIG. 6, and redundant descriptions, hereinafter, may be omitted.

Referring to FIG. 10, in operation 1001, a first electronic device (e.g., the power transfer device or the first electronic device 301 of FIG. 3, 4, or 5) may establish a communication connection to a second electronic device (e.g., the power reception device or the second electronic device 302 of FIG. 3, 4, or 5). For example, in an identification and configuration operation (e.g., the identification and configuration operation 520 of FIG. 5) for configuring a wireless charging process with the second electronic device 302 recognized based on a ping operation (e.g., the ping operation 510 of FIG. 5), a control circuit (e.g., the control circuit 412 of FIG. 4) of the first electronic device 301 may control a first communication circuit (e.g., the first communication circuit 413a of FIG. 4) so as to establish the first communication connection to a first communication circuit (e.g., the first communication circuit 423a of FIG. 4) of the second electronic device 302. According to an embodiment, the first communication may include in-band communication using a frequency of a band identical to or adjacent to that of a frequency used to transfer wireless power in a power transfer coil (e.g., the power transfer coil 411L of FIG. 4).

In addition, in the identification and configuration operation 520 of configuring a wireless charging process with the second electronic device 302, the control circuit 412 of the first electronic device 301 may control a second communication circuit (e.g., the second communication circuit 413b of FIG. 4) so as to establish second communication connection to a second communication circuit (e.g., the second communication circuit 423b of FIG. 4) of the second electronic device 302. According to an embodiment, the second communication may include out-band communication (e.g., at least one of Bluetooth low energy communication, Bluetooth communication, Wi-Fi communication, cellular communication, and near field wireless communication) using a frequency of a band different from that of a frequency used in the power transfer coil 411L for wireless power transfer by the first electronic device 301. According to various embodiments, after connecting to the second electronic device 302 via the second communication, the control circuit 412 of the first electronic device 301 may control the second communication circuit 413b supporting the second communication to be at least temporarily inactive, or maintain the second communication circuit 413b active.

In operation 1003, the control circuit 412 of the first electronic device 301 may receive a signal (e.g., a first signal) including a CEP from the second electronic device 302 by using the first communication connected to the second electronic device 302. For example, the control circuit 412 may receive a signal including a CEP from the first communication circuit 423a of the second electronic device 302 by using the first communication at a first time point after a connection is made to the second electronic device 302 via the first communication. In an embodiment, in response to reception of the signal at the first time point, the control circuit 412 may identify whether a signal including a CEP is received from the second electronic device 302 within a designated unit time based on the first time point. For example, if a signal including a CEP is received from the first communication circuit 423a of the second electronic device 302 within a first unit time based on the first time point, the control circuit 412 may determine that the CEP has been normally received via the first communication circuit 413a during the first unit time.

In operation 1005, the control circuit 412 of the first electronic device 301 may count the number of times (e.g., the first number of times) that the unit time elapses without reception of a signal including a CEP from the second electronic device 302. For example, according to determination that the CEP has been normally received via the first communication during the first unit, the control circuit 412 may identify whether a signal including a CEP is received via the first communication for a second unit time subsequent to the first unit time. The control circuit 412 may count one time if the second unit time elapses without reception of a signal including a CEP from the second electronic device 302 via the first communication during the second unit time.

In operation 1007, the control circuit 412 of the first electronic device 301 may determine whether the number of counts (e.g., one time) corresponds to a designated first threshold value. The designated first threshold value may be configured, for example, to be a value smaller than a designated second threshold value referred to in order for the first electronic device 301 to stop wireless charging (or wireless power transfer function). In an embodiment, if the counted number of times is determined not to correspond to the first threshold value, the control circuit 412 may identify whether a signal including a CEP has been received via the first communication for a third unit time subsequent to the second unit time. The control circuit 412 may count one time if the third unit time elapses without reception of a signal including a CEP from the second electronic device 302 via the first communication during the third unit time, and may add up one count for the previous second unit time and one count for the third unit time.

Similar to the above, the control circuit 412 of the first electronic device 301 may identify whether a signal including a CEP is received via the first communication for an Nth unit time. When the N unit time elapses without reception of a signal including a CEP from the second electronic device 302 during the N unit time, the control circuit 412 may count M times by adding previously added M−1 times and one time obtained by counting for the N unit time. In an embodiment, if the counted M times corresponds to (or reaches) the designated first threshold value, the control circuit 412 may determine that a CEP is not normally received via the first communication after the first time point at which the signal including the CEP is first received from the second electronic device 302.

In an embodiment, according to determination that a CEP is not normally received via the first communication, the control circuit 412 of the first electronic device 301 may determine to switch from the first communication to the second communication. In this regard, the control circuit 412 may control the inactive second communication circuit 413b to be at least temporarily active. Alternatively, if the second communication circuit 413b is active, the control circuit 412 may maintain the second communication circuit 413b active. In addition, the control circuit 412 may maintain an active state of the first communication circuit 413a supporting the first communication.

In operation 1009, the control circuit 412 of the first electronic device 301 may transmit or receive at least one signal or data to or from the second electronic device 302 by using the second communication. For example, the control circuit 412 may transmit, to the second electronic device 302, a signal (e.g., a seventh signal) for requesting the second electronic device 302 to provide a CEP via the second communication, and may receive, via the second communication, a signal including a CEP transmitted from the second electronic device 302 in response to the request.

According to various embodiments, the control circuit 412 of the first electronic device 301 may use the second communication to cause the second electronic device 302 to maintain the connection of the first communication established with respect to the first electronic device 301, and may transmit, while transmitting a signal including a CEP via the second communication, a signal (e.g., an eighth signal) for requesting transmission of a signal including a CEP via the first communication. Based on this, the second electronic device 302 may transmit a signal including a CEP via each of the first communication and the second communication which are connected to the first electronic device 301.

In an embodiment, while receiving a signal including a CEP from the second electronic device 302 by using the second communication, the control circuit 412 of the first electronic device 301 may identify whether a signal including a CEP is normally received via the first communication. For example, based on the time at which the signal including the CEP is first received via the second communication, if a signal including a CEP is received via the first communication during the first unit time, the control circuit 412 may count one time for elapse of the first unit time. In addition, if a signal including a CEP is received via the first communication during a second unit time subsequent to the first unit time, the control circuit 412 may count one time for elapse of the second unit time. In an embodiment, if unit times for reception of signals including a CEP via the first communication have a continuous sequence, and the sum of the counted number of times corresponds to (or reaches) a designated third threshold value, the control circuit 412 may determine that the CEP is normally received via the first communication after establishment of the second communication connection to the second electronic device 302. According to determination that the CEP has been normally received via the first communication, the control circuit 412 may transmit a signal (e.g., a ninth signal) to the second electronic device 302 by using the first communication or the second communication. For example, the control circuit 412 may transmit a signal for requesting the second electronic device 302 to at least temporarily control the second communication circuit 423b of the second electronic device 302 to be inactive and provide a CEP via the first communication.

An electronic device according to various embodiments described above may include a first communication circuit supporting first communication in a first frequency band, a second communication circuit supporting second communication in a second frequency band different from the first frequency band, a power transfer coil, and a control circuit electrically connected to the first communication circuit, the second communication circuit, and the power transfer coil.

According to various embodiments, the control circuit may establish, based on the first communication circuit, a first communication connection to an external electronic device, transfer power to the external electronic device based on the first communication using the power transfer coil, receive, based on the first communication, a first signal including a control error packet (CEP) from the external electronic device at a first time point, count, after the first time point, a first number of times for elapse of a designated unit time without reception of the first signal, and if the first number of times for elapse of the designated unit time without reception of the first signal corresponds to a designated first threshold value, transmit, to the external electronic device based on the first communication, a second signal for requesting a second communication connection to the external electronic device, establish the second communication connection to the external electronic device, based on reception of a third signal including a response of the external electronic device to the second signal, and transmit or receive, based on the second communication to or from the external electronic device, at least one piece of data related to the power transfer.

According to various embodiments, the control circuit may perform counting for a first unit time if the first unit time elapses without reception of the first signal during the first unit time based on the first time point, perform counting for a second unit time subsequent to the first unit time if the second unit time elapses without reception of the first signal during the second unit time, and count the first number of times by adding up the count for the first unit time and the count for the second unit time.

According to various embodiments, the control circuit may perform counting for the first unit time if the first unit time elapses without reception of the first signal during the first unit time based on the first time point, skip counting for a second unit time subsequent to the first unit time if the first signal is received during the second unit time, perform counting for a third unit time subsequent to the second unit time if the third unit time elapses without reception of the first signal during the third unit time, and count the first number of times by adding the count for the first unit time and the count for the third unit time.

According to various embodiments, the control circuit may determine a reference (starting point) of the third unit time, based on a second time point at which the first signal is received during the second unit time.

According to various embodiments, the control circuit may be configured to stop the power transfer if a second number of times for elapse of the designated unit time without reception of the first signal corresponds to a designated second threshold value, and the designated first threshold value may be configured to be a value smaller than the designated second threshold value.

According to various embodiments, if the first number of times for elapse of the unit time without reception of the first signal corresponds to the designated first threshold value, the control circuit may control the second communication circuit to be active.

According to various embodiments, the control circuit may further add, to the second signal, a request for the external electronic device supporting the second communication to control a communication circuit of the external electronic device to be active.

According to various embodiments, the control circuit may acquire, based on the first communication from the external electronic device, information on a charging mode of the external electronic device, and if the information on the charging mode of the external electronic device indicates a constant voltage (CV) mode, count the first number of times for elapse of the designated unit time without reception of the first signal.

According to various embodiments, the control circuit may establish the second communication connection while maintaining the first communication connection to the external electronic device.

According to various embodiments, the control circuit may transmit, to the external electronic device based on the second communication, a fourth signal for requesting transmission of the first signal via the first communication and transmission of the first signal via the second communication.

According to various embodiments, the control circuit may receive, based on the first communication, the first signal from the external electronic device after a third time point for reception of the first signal from the external electronic device based on the second communication, count a third number of times for elapse of the designated unit time, and if the first signal is received and the third number of times for elapse of the designated unit time corresponds to a designated third threshold value, transmit a fifth signal for requesting the external electronic device to control a communication circuit of the external electronic device supporting the second communication to be at least temporarily inactive, based on the first communication or the second communication.

A wireless charging method of an electronic device according to various embodiments described above may include establishing a first communication connection to an external electronic device in a first frequency band, transferring power to the external electronic device based on the first communication using a power transfer coil, receiving, based on the first communication, a first signal including a control error packet (CEP) from the external electronic device at a first time point, and counting, after the first time point, a first number of times for elapse of a designated unit time without reception of the first signal.

According to various embodiments, the counting of the first number of times may include determining that the first number of times for elapse of the designated unit time without reception of the first signal corresponds to a designated first threshold value, transmitting, to the external electronic device based on the first communication, a second signal for requesting a second communication connection to the external electronic device in a second frequency band different from the first frequency band, establishing the second communication connection to the external electronic device, based on reception of a third signal including a response of the external electronic device to the second signal, and transmitting or receiving at least one piece of data related to the power transfer, to or from the external electronic device based on the second communication.

According to various embodiments, the counting of the first number of times may include performing counting for the first unit time if the first unit time elapses without reception of the first signal during the first unit time based on the first time point, performing counting for a second unit time subsequent to the first unit time if the second unit time elapses without reception of the first signal during the second unit time, and counting the first number of times by adding up the count for the first unit time and the count for the second unit time.

According to various embodiments, the counting of the first number of times may include performing counting for the first unit time if the first unit time elapses without reception of the first signal during the first unit time based on the first time point, skipping counting for a second unit time subsequent to the first unit time if the first signal is received during the second unit time, performing counting for a third unit time subsequent to the second unit time if the third unit time elapses without reception of the first signal during the third unit time, and counting the first number of times by adding up the count for the first unit time and the count for the third unit time.

According to various embodiments, the counting of the first number of times may include determining a reference (starting point) of the third unit time, based on a second time point at which the first signal is received during the second unit time.

According to various embodiments, the wireless charging method may further include, if a second number of times for elapse of the designated unit time without reception of the first signal corresponds to a designated second threshold value, stopping the power transfer.

According to various embodiments, the designated first threshold value may be configured to be a value smaller than the designated second threshold value.

According to various embodiments, the wireless charging method may further include acquiring, based on the first communication from the external electronic device, information on a charging mode of the external electronic device, and the counting of the first number of times may further include counting the first number of times if the information on the charging mode of the external electronic device indicates a constant voltage (CV) mode.

According to various embodiments, the establishing of the second communication connection may include establishing the second communication connection while maintaining the first communication connection to the external electronic device.

According to various embodiments, the transmitting or receiving of the at least one piece of data may include transmitting, to the external electronic device based on the second communication, a fourth signal for requesting transmission of the first signal via the first communication and transmission of the first signal via the second communication.

According to various embodiments, the wireless charging method may further include receiving, based on the first communication, the first signal from the external electronic device after a third time point for reception of the first signal from the external electronic device based on the second communication, counting a third number of times for elapse of the designated unit time, and if the first signal is received and the third number of times for elapse of the designated unit time corresponds to a designated third threshold value, transmitting a fifth signal for requesting the external electronic device to control a communication circuit of the external electronic device supporting the second communication to be at least temporarily inactive, based on the first communication or the second communication.

An electronic device according to various embodiments described above may include a first communication circuit supporting first communication in a first frequency band, a second communication circuit supporting second communication in a second frequency band different from the first frequency band, a power transfer coil, and a control circuit electrically connected to the first communication circuit, the second communication circuit, and the power transfer coil.

According to various embodiments, the control circuit may establish the first communication connection to an external electronic device based on the first communication circuit, establish, when the first communication connection is established, the second communication connection to the external electronic device based on the second communication circuit, transfer power to the external electronic device based on the first communication using the power transfer coil, receive, based on the first communication, a first signal including a control error packet (CEP) from the external electronic device at a first time point, count, after the first time point, a first number of times for elapse of a designated unit time without reception of the first signal, and if the first number of times for elapse of the designated unit time without reception of the first signal corresponds to a designated first threshold value, transmit a second signal for requesting transmission of the first signal including the CEP by using the second communication to the external electronic device based on the second communication, and receive the first signal including the CEP from the external electronic device based on the second communication.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first communication circuit configured to support first communication in a first frequency band;
   a second communication circuit configured to support second communication in a second frequency band different from the first frequency band;
   a power transfer coil; and
   a control circuit electrically connected to the first communication circuit, the second communication circuit, and the power transfer coil, wherein the control circuit is configured to:
   based on the first communication circuit, establish a first communication connection to an external electronic device,
   based on the first communication using the power transfer coil, transfer power to the external electronic device,
   based on the first communication, receive a first signal comprising a control error packet (CEP) from the external electronic device at a first time point,
   after the first time point, count a first number of times that a designated unit of time without reception of the first signal has elapsed,
   in case that the first number of times the designated unit of time elapses without reception of the first signal corresponds to a designated first threshold value,
   based on the first communication, transmit, to the external electronic device, a second signal for requesting a second communication connection to the external electronic device,
   based on reception of a third signal comprising a response of the external electronic device to the second signal, establish the second communication connection to the external electronic device, and
   based on the second communication, transmit or receive, to or from the external electronic device, at least one piece of data related to the power transfer.

2. The electronic device of claim 1, wherein the control circuit is further configured to:
   in case that a first unit time elapses without reception of the first signal during the first unit time based on the first time point, perform counting for the first unit time;
   in case that a second unit time subsequent to the first unit time elapses without reception of the first signal during the second unit time, perform counting for the second unit time; and count the first number of times by adding up the count for the first unit time and the count for the second unit time.

3. The electronic device of claim 1, wherein the control circuit is further configured to:
in case that a first unit time elapses without reception of the first signal during the first unit time based on the first time point, perform counting for the first unit time;
in case that the first signal is received during a second unit time subsequent to the first unit time, skip counting for the second unit time;
in case that a third unit time subsequent to the second unit time elapses without reception of the first signal during the third unit time, perform counting for the third unit time; and
count the first number of times by adding the count for the first unit time and the count for the third unit time.

4. The electronic device of claim 3, wherein the control circuit is further configured to determine a reference (starting point) of the third unit time, based on a second time point at which the first signal is received during the second unit time.

5. The electronic device of claim 1,
wherein the control circuit is further configured to stop the power transfer in case that a second number of times for elapse of the designated unit time without reception of the first signal corresponds to a designated second threshold value, and
wherein the designated first threshold value is configured to be a value smaller than the designated second threshold value.

6. The electronic device of claim 1, wherein the control circuit is further configured to:
based on the first communication, acquire information on a charging mode of the external electronic device from the external electronic device; and
in case that the information on the charging mode of the external electronic device indicates a constant voltage (CV) mode, count the first number of times for elapse of the designated unit time without reception of the first signal.

7. The electronic device of claim 1, wherein the control circuit is further configured to, based on the second communication, transmit, to the external electronic device, a fourth signal for requesting transmission of the first signal via the first communication and transmission of the first signal via the second communication.

8. The electronic device of claim 7, wherein the control circuit is further configured to:
after a third time point at which the first signal is received from the external electronic device based on the second communication, receive the first signal from the external electronic device based on the first communication, and count a third number of times for elapse of the designated unit time; and
in case that the first signal is received and the third number of times for elapse of the designated unit time corresponds to a designated third threshold value, transmit a fifth signal for requesting the external electronic device to control a communication circuit of the external electronic device supporting the second communication to be at least temporarily inactive, based on the first communication or the second communication.

9. The electronic device of claim 1, wherein the control circuit is further configured to control the second communication circuit to be active in case that the first number of times for elapse of the unit time without reception of the first signal corresponds to the designated first threshold value.

10. The electronic device of claim 1, wherein the control circuit is further configured to add, to the second signal, a request for the external electronic device supporting the second communication to control a communication circuit of the external electronic device to be active.

11. The electronic device of claim 1, wherein the control circuit is further configured to establish the second communication connection while maintaining the first communication connection to the external electronic device.

12. A wireless charging method of an electronic device, the method comprising:
establishing a first communication connection to an external electronic device in a first frequency band;
based on first communication using a power transfer coil, transferring power to the external electronic device;
based on the first communication, receiving a first signal comprising a control error packet (CEP) from the external electronic device at a first time point; and
after the first time point, counting a first number of times that a designated unit of time without reception of the first signal elapses, wherein the counting of the first number of times comprises:
determining that the first number of times that the designated unit of time elapses without reception of the first signal, corresponds to a designated first threshold value,
based on the first communication, transmitting, to the external electronic device, a second signal for requesting a second communication connection to the external electronic device in a second frequency band different from the first frequency band,
based on reception of a third signal comprising a response of the external electronic device to the second signal, establishing the second communication connection to the external electronic device, and
based on the second communication, transmitting or receiving, to or from the external electronic device, at least one piece of data related to the power transfer.

13. The method of claim 12, wherein the counting of the first number of times further comprises:
in case that a first unit time elapses without reception of the first signal during the first unit time based on the first time point, performing counting for the first unit time;
in case that a second unit time subsequent to the first unit time elapses without reception of the first signal during the second unit time, performing counting for the second unit time; and
counting the first number of times by adding up the count for the first unit time and the count for the second unit time.

14. The method of claim 12, wherein the counting of the first number of times further comprises:
in case that a first unit time elapses without reception of the first signal during the first unit time based on the first time point, performing counting for the first unit time;
in case that the first signal is received during a second unit time subsequent to the first unit time, skipping counting for the second unit time;
in case that a third unit time subsequent to the second unit time elapses without reception of the first signal during the third unit time, performing counting for the third unit time; and
counting the first number of times by adding the count for the first unit time and the count for the third unit time.

15. The method of claim 14, wherein the counting of the first number of times further comprises determining a reference (starting point) of the third unit time, based on a second time point at which the first signal is received during the second unit time.

16. The method of claim 12, further comprising stopping the power transfer in case that a second number of times for elapse of the designated unit time without reception of the first signal corresponds to a designated second threshold value, wherein the designated first threshold value is configured to be a value smaller than the designated second threshold value.

17. The method of claim 12, wherein the transmitting or receiving of the at least one piece of data comprises, based on the second communication, transmitting, to the external electronic device, a fourth signal for requesting transmission of the first signal via the first communication and transmission of the first signal via the second communication.

18. The method of claim 17, further comprising:

after a third time point at which the first signal is received from the external electronic device based on the second communication, receiving the first signal from the external electronic device based on the first communication, and counting a third number of times for elapse of the designated unit time; and in case that the first signal is received and the third number of times for elapse of the designated unit time corresponds to a designated third threshold value, transmitting a fifth signal for requesting the external electronic device to control a communication circuit of the external electronic device supporting the second communication to be at least temporarily inactive, based on the first communication or the second communication.

19. The method of claim 12, further comprising acquiring, based on the first communication from the external electronic device, information on a charging mode of the external electronic device, wherein the counting of the first number of times further comprises counting the first number of times if the information on the charging mode of the external electronic device indicates a constant voltage (CV) mode.

20. The method of claim 12, wherein the establishing of the second communication connection comprises establishing the second communication connection while maintaining the first communication connection to the external electronic device.

* * * * *